Sept. 2, 1947.     J. T. MURPHY     2,426,704
RESILIENT VEHICLE WHEEL
Filed May 4, 1944     3 Sheets-Sheet 3
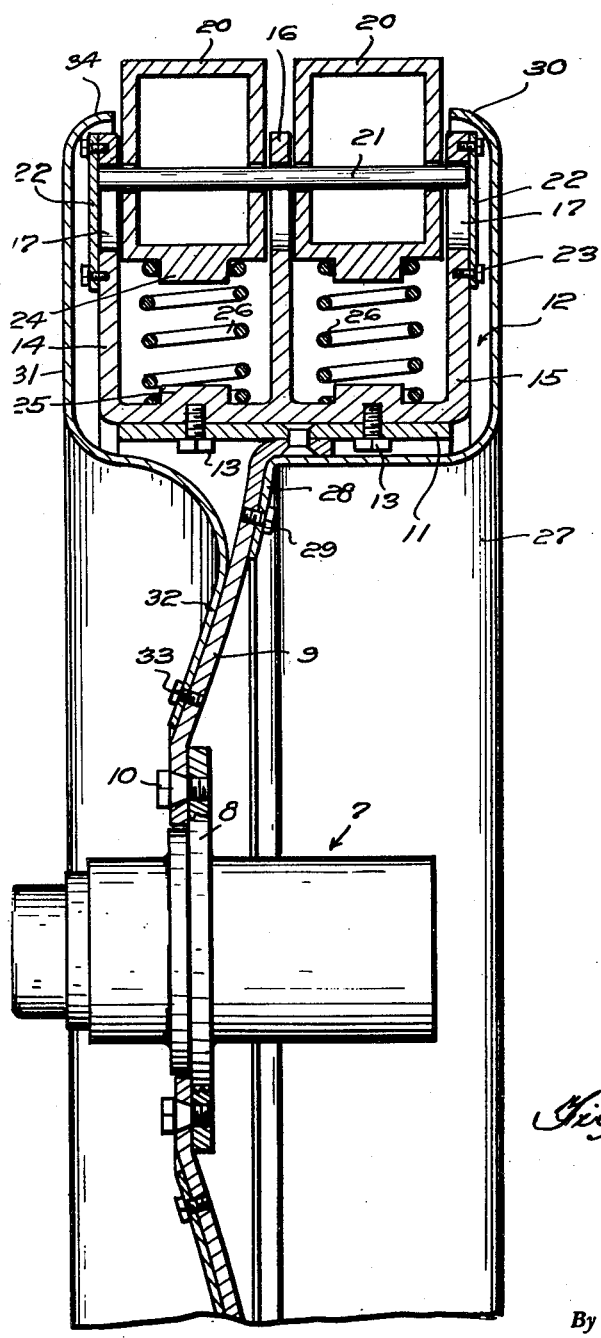
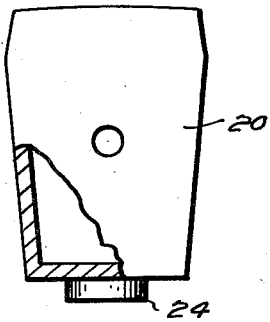
Fig. 5.
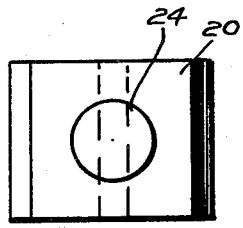
Fig. 6.
Fig. 4.
Inventor
JOSEPH T. MURPHY,
By Clarence A. O'Brien
and Harvey B. Jacobson
Attorneys Patented Sept. 2, 1947

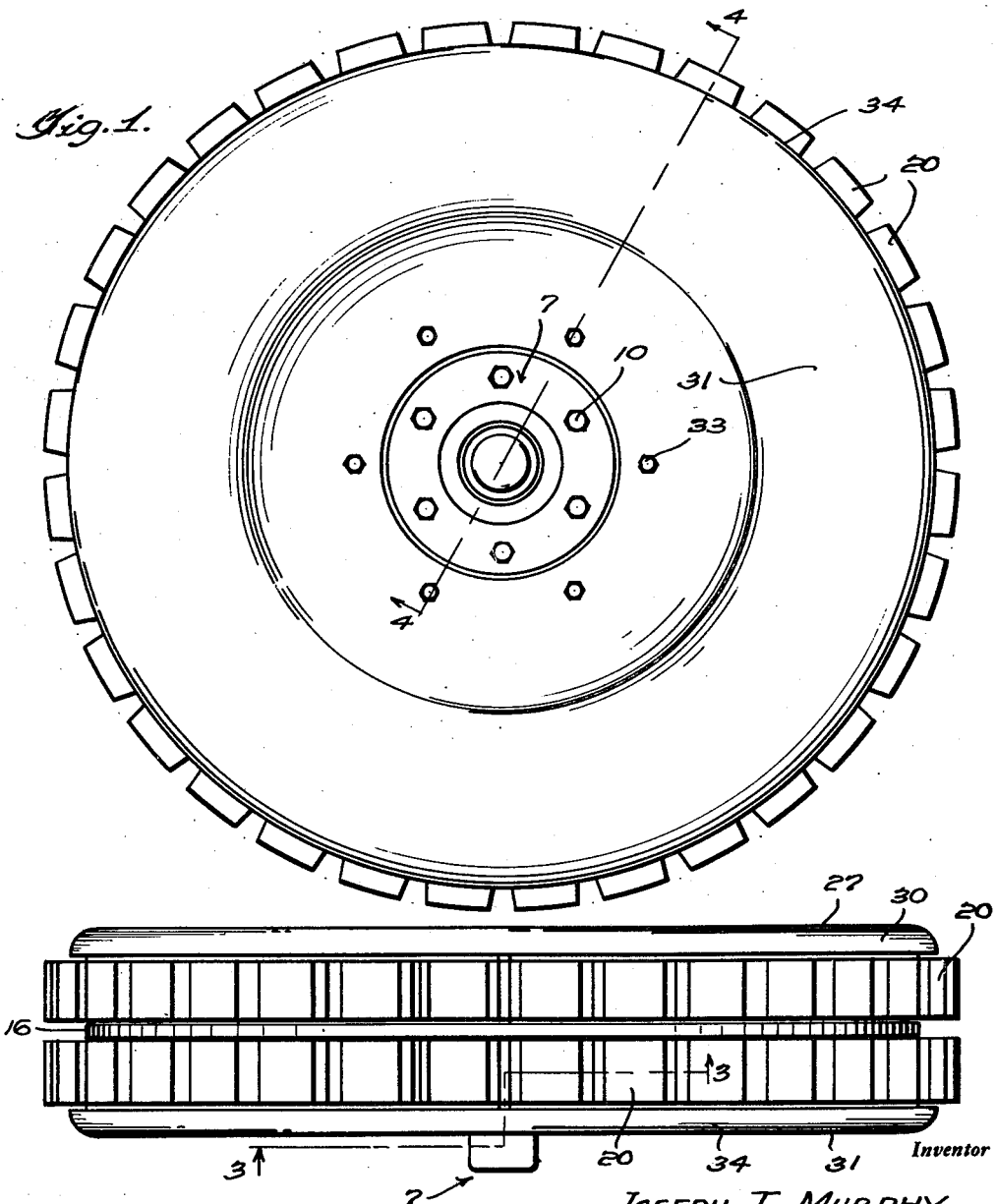

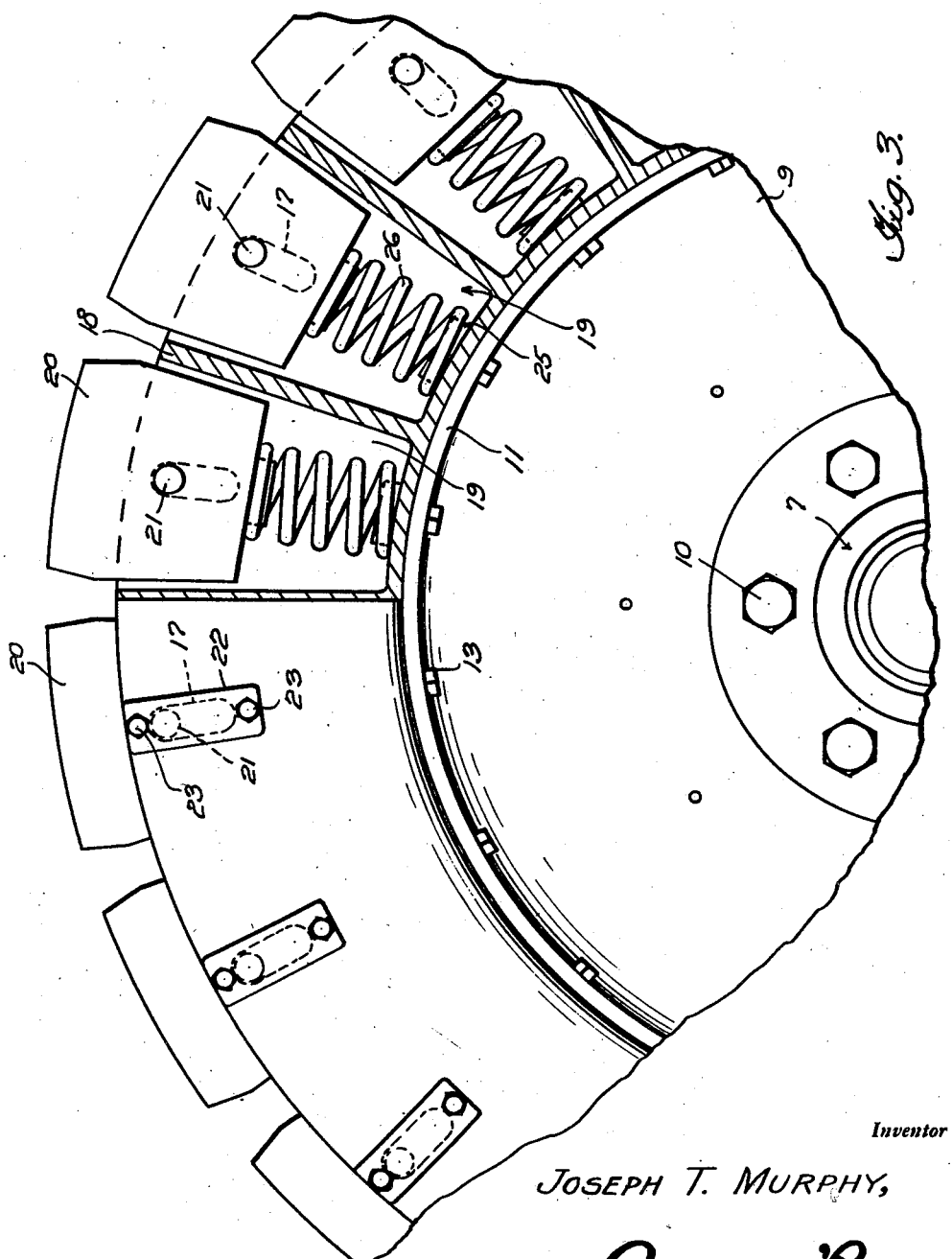

2,426,704

UNITED STATES PATENT OFFICE 2,426,704

RESILIENT VEHICLE WHEEL

Joseph T. Murphy, Akron, Ohio

Application May 4, 1944, Serial No. 534,130

1 Claim. (Cl. 152—290)

This invention relates to an improved resilient wheel adaptable for use on such vehicles as automobiles, tractors, trucks, buses and the like, and the primary purpose is to provide a novel and improved sectional tread adapted to function as an appropriately cushioned tire, the complete arrangement being relatively simple and inexpensive and providing cushioning and shock absorbing properties substantially equal to those of present-day pneumatic tires, this while avoiding the well known disadvantages and objections attending the latter.

More specifically, the structure is characterized by an annular rim or felly rigidly and suitably supported from the hub structure, this provided with a surrounding multiple pocket-equipped adapter, the latter serving as an appropriate mount for radially slidable spring-cushioned wear-resisting block-like traction shoes.

A further feature of the invention pertains to the sectional enclosing shell or housing, the latter protecting and concealing the adapter and block assemblage and further serving to give the overall structure the appearance of an ordinary vehicle wheel and tire combination.

The invention also consists in certain other elements and features of construction and in the combination and arrangement of the selected and coordinated parts, to be hereinafter fully set forth, illustrated in the accompanying drawings and particularly comprehended in the concluding claim.

Other features and advantages will become more readily apparent from the description read in conjunction with the drawings.

In the drawings, wherein like numerals are employed to designate like parts throughout the same:

Figure 1 is a side elevational view of a wheel and tire structure constructed in accordance with the specific principles of the present invention.

Figure 2 is a top plan view of the same.

Figure 3 is an enlarged fragmentary detailed section, this taken approximately on the irregular line 3—3 of Figure 2, looking in the direction of the arrows.

Figure 4 is an enlarged fragmentary sectional and elevational view, this taken on the plane of the line 4—4 of Figure 1 and looking in the direction of the arrows.

Figures 5 and 6 are detail elevational views of the tread blocks or shoes.

The wheel hub structure is denoted in Figure 4 by the numeral 7 and has an outstanding hub or wheel flange 8 to which the annulus or main frame plate 9 is connected as at 10. The outer marginal edge of this plate 9 is provided with a lateral flange to which the annular rim or felly 11 is rigidly connected. The aforementioned adapter unit 12 is channel-shaped in cross-section and fits tightly upon the rim 11, being secured thereto by bolts or equivalent fastenings 13. This adapter comprises spaced parallel outer walls 14 and 15 of duplicate construction and an intermediate or intervening central partitioning wall 16. These walls are provided with aligned slots 17 which function in a manner to be hereinafter described. The partition 16 divides the adapter into inner and outer half-sections. Then, as brought out in Figure 3, these half-sections are circumferentially divided by transverse partitions or webs 18 into cells or pockets 19, the latter tapering inwardly. The pockets are adapted to accommodate the said blocks 20, these being correspondingly tapered and being preferably composed of hollow aluminum wear-resisting blocks. It is believed that the latter will function with requisite certainty and security. Each of the pockets is provided with its associated block and thus we have inner and outer rows of blocks, the blocks being arranged in opposed pairs, that is, the blocks of the respective circumferential rows. A pin, that is, an assembling pin 21 (see Figure 4) passes through and is anchored in the blocks and the extended ends are slidably mounted in the slots 17, the intermediate portions slidably mounted in the slots in the partition 16. It will be noted in Figure 4 that the outer slots 17 are provided with cover plates 22 removably fastened in place by screws 23. It will be noted too, that the tread blocks are provided at their inner ends with short projecting studs 24 in alignment with similar studs 25 in the bottom portions of the respective pockets. The cushioning springs 26, also confined in said pockets, have their outer end coils surrounding and anchored upon said studs 24 and 25.

As before stated the mechanism is enclosed in a sectional housing. The inner section, which is of sheet metal or the like is denoted at 27 and embraces the adjacent portions of the coacting structure, the same having a flange 28 at its inner end bolted or otherwise secured by screws 29 to the aforementioned frame plate 9. The outer marginal or peripheral edge is formed into a curvate portion 30 which takes over the adjacent or corresponding outer edges of the wall 15. The outer housing section is denoted at 31 and is somewhat the same in shape, this having an attaching flange 32 secured in place by screws 33 and having an outer marginal edge flange 34 which covers the coacting cover plates 22 and hooks over the outer marginal edge of the wall 14. The housing sufficiently encloses the structure to serve as a shield or guard as well as serving to import the desired finished appearance to the complete wheel and tire.

Novelty is predicated upon the adapter unit 12 removably mounted on the rim 13, having a central partition 16 and transverse partition dividing the same into inner and outer half-sections and the half-sections into circumferentially spaced tapered pockets. Novelty also resides in the provision of the pairs of blocks in the inner and outer rows linked together by the assembling pins or rods 21, these rods being slidable in the slots in the walls 14, 15 and 16 of said adapter. The enclosing sections 27 and 31 forming the protective and shaping housing are also important. In fact, it is believed that a wheel equipped with a puncture-proof tire of the type herein shown and described is highly as well as aptly fitted for the purposes intended.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A resilient wheel including a disc and an annular member surrounding said disc and having side walls formed with opposed radially extending slots, tread members in said annular member shiftable radially therein and urged upwardly and having retainer pins projecting from their sides and slidably engaged in said slots to guide and limit sliding movement of the tread members, plates detachably mounted flat against outer faces of the side walls and covering the slots and preventing accidental displacement of the pins from the slots, and annular shields secured against sides of said disc and having portions extending along the annular member outwardly thereof in covering relation to the annular member and the plates, said shields having inwardly curved flanges along their outer margins overlapping outer edges of the side walls and spaced from side faces of the tread members.

JOSEPH T. MURPHY.

REFERENCES CITED

The following references are of record in the file of this patent:

UNITED STATES PATENTS

| Number | Name | Date |
|---|---|---|
| 802,050 | Lungwitz | Oct. 17, 1905 |
| 1,040,694 | Kohler | Oct. 8, 1912 |
| 903,066 | Ellis | Nov. 3, 1908 |
| 1,274,974 | Bergstrom | Aug. 9, 1918 |
| 969,241 | Baker | Sept. 6, 1910 |
| 20,318 | Barrett | May 25, 1858 |
| 987,191 | Tremmel | Mar. 21, 1911 |
| 1,392,667 | Wagner | Oct. 4, 1921 |
| 1,730,872 | Baker | Oct. 8, 1929 |

FOREIGN PATENTS

| Number | Country | Date |
|---|---|---|
| 270,719 | Great Britain | 1927 |
| 13,443 | Great Britain | 1905 |